Jan. 26, 1965   A. NEUKOM ETAL   3,167,637
WORK-HOLDING APPARATUS
Filed April 5, 1962
2 Sheets-Sheet 1

Inventors:
Alfred Neukom and
Guenther Rabenow
by Michael S. Striker
Attorney

Jan. 26, 1965     A. NEUKOM ETAL     3,167,637
WORK-HOLDING APPARATUS

Filed April 5, 1962     2 Sheets-Sheet 2

Inventors
Alfred Neukom
and Guenther Rabenow
by Michael S. Striker
Attorney

United States Patent Office 3,167,637
Patented Jan. 26, 1965

3,167,637
WORK-HOLDING APPARATUS
Alfred Neukom, Dubendorf, Zurich, and Guenther Rabenow, Wettingen, Aargau, Switzerland, assignors to H. A. Schlatter AG, Zurich, Switzerland
Filed Apr. 5, 1962, Ser. No. 185,320
Claims priority, application Switzerland, Apr. 7, 1961, 4,068/61
10 Claims. (Cl. 219—161)

The present invention relates to work-holding apparatus.

More particularly, the present invention relates to work-holding apparatus of the type used in welding machines.

The present invention is particularly applicable to that type of welding apparatus which is disclosed in U.S. Patents 2,761,951, 2,781,026, and 2,787,698. In apparatus of this type it is necessary to apply electrodes to the workpieces so as to be able to conduct thereto the electrical current necessary for welding. In order to have a high degree of electrical conductivity, these electrodes are made of a copper alloy which has a small electrical resistance. Such electrodes are not suitable for gripping and holding the workpiece because they do not have a great enough coefficient of friction to securely hold the workpieces during the application thereto of the relatively large forces required to effect the welding of a pair of workpieces to each other. If the electrodes are used for this purpose they will only be worn away very rapidly.

On the other hand, the wear-resistant material which would be suitable for securely gripping relatively heavy workpieces, such as steel work-gripping members which have a sufficient coefficient of friction, have very poor electrical conductivity and their electrical resistance is too great to render them suitable for conducting electricity to the workpieces for the purpose of effecting the necessary welding.

In view of the above considerations, it is conventional in machines of the above type to provide work-gripping elements which are separate from the electrodes which engage the work to supply the current thereto, and such work-gripping elements are capable of exerting the necessary force to securely hold the relatively heavy workpieces and are conventionally made of steel, while the electrodes are made of a copper alloy and are applied to the workpiece only with the relatively small amount of pressure necessary to efficiently transmit the electrical current.

The work in a machine of the above type is usually supported and gripped by vertically movable gripping members and the force with which these gripping members engage the work can be regulated so as to adapt the gripping members to use with workpieces which are of different weights. However, relatively small, light workpieces are unavoidably deformed when gripped by gripping members designed for relatively large, heavy workpieces, and where the gripping area is small the workpieces and the gripping elements are injured. The range within which the gripping force may vary for a given pair of gripping members is limited for practical, structural reasons. In practice, a pair of gripping members which can exert, for example, a gripping force of 400 tons as a maximum will be incapable of exerting a minimum force of less than approximately 60 tons. Therefore, even though the gripping force can be adjusted, the adjustment is limited to a given range, and in this particular example workpieces which cannot withstand a gripping force of approximately 60 tons will be injured and simply cannot be accommodated by such gripping members.

It is accordingly a primary object of the present invention to provide a machine of the above type with an apparatus which is capable of efficiently holding and gripping workpieces which otherwise would be incapable of being held by a conventional apparatus.

A further object of the present invention is to provide a machine of the above type which can handle relatively large heavy workpieces and which at the same time is capable of holding small, light workpieces without in any way injuring the workpiece or the apparatus.

It is furthermore an object of the present invention to provide a structure of the above type which can grip and hold workpieces which vary through sizes and weights far greater than has hitherto been possible with one machine while at the same time operating the apparatus efficiently for relatively small, light workpieces as well as for relatively heavy, large workpieces, so that there is no great waste of energy resulting from using for relatively small workpieces structure designed to be used with relatively large heavy workpieces.

An additional object of the present invention is to provide a structure which is particularly suitable for welding machines of the above type and which can accomplish the above objects while at the same time being capable of efficiently transmitting electrical current to the workpiece even though the apparatus can handle workpieces which vary through an extremely large range of sizes.

Still another object of the present invention is to provide a structure of the above type which is extremely simple and reliable in operation.

With the above objects in view the invention includes, in a work-holding apparatus for welding machines or the like, a pair of electrodes and a pair of work-gripping members. A first moving means cooperates with one of the pair of electrodes for moving it toward the other of the pair of electrodes so that a workpiece located between the pair of electrodes will be engaged thereby so as to enable a current to be supplied to the workpiece itself in connection with the welding thereof to another workpiece, for example. A second moving means cooperates with at least one of the work-gripping members for moving it toward the other of the work-gripping members so that the workpiece which is engaged by the electrodes can also be gripped between the pair of work-gripping members. A means, in accordance with the present invention, cooperates with the second moving means to render the latter inoperable at the option of the operator, so that the operator has the option of using the pair of work-gripping members or of not using the pair of work-gripping members in order to grip a given workpiece. When the machine is required to handle relatively large, heavy workpieces, the second moving means is used and such a workpiece is gripped by the pair of gripping members and is also engaged by the pair of electrodes. However, when the machine is required to handle a relatively light workpiece, then the second moving means does not come into play and the pair of work-gripping members are not used. Instead at this time, only the first moving means is actuated to cause the workpiece to be engaged by the electrodes, and in this case because the workpiece is relatively light the electrodes themselves exert on the workpiece a sufficient force to grip and hold the workpiece while at the same time the electrodes are capable of transmitting current thereto, so that by using the electrodes themselves to engage and hold relatively light workpieces it is possible to use the same machine for workpieces which not only are relatively heavy but also for workpieces which are quite light, without in any way injuring either the workpieces or the machine itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
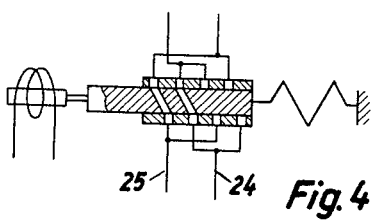
Figure 6:
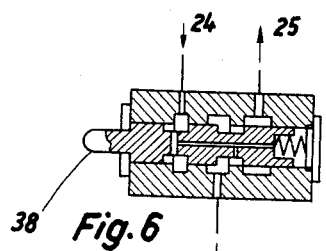
Figure 5:
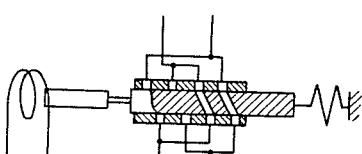
Figure 7:
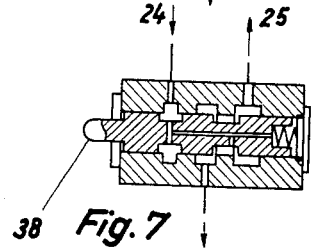

FIGS. 4 and 5 are diagrammatic longitudinal sectional views respectively illustrating a solenoid-operated valve assembly in two different positions, this valve assembly being used at several points in the machine of the invention; and FIGS. 6 and 7 are longitudinal sectional views showings, in two different positions, respectively, a control valve assembly which automatically provides a balance between pairs of members which grip and engage the work.

Figure 1:
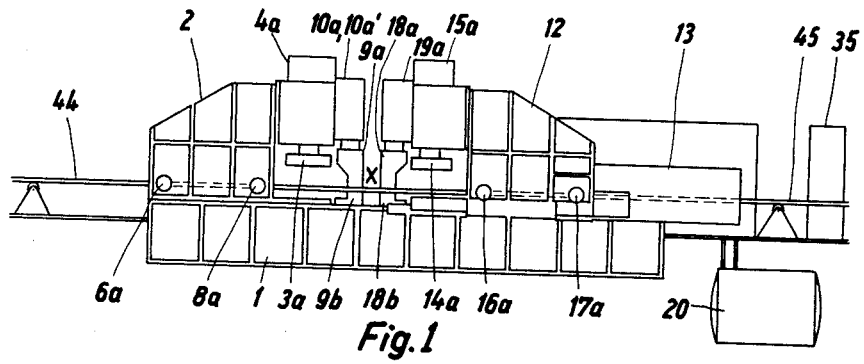
FIG. 1 is a diagrammatic side elevational view of a machine according to the present invention which in the illustrated example is used for flash welding of a pair of rails in end-to-end relation.
Figure 2:
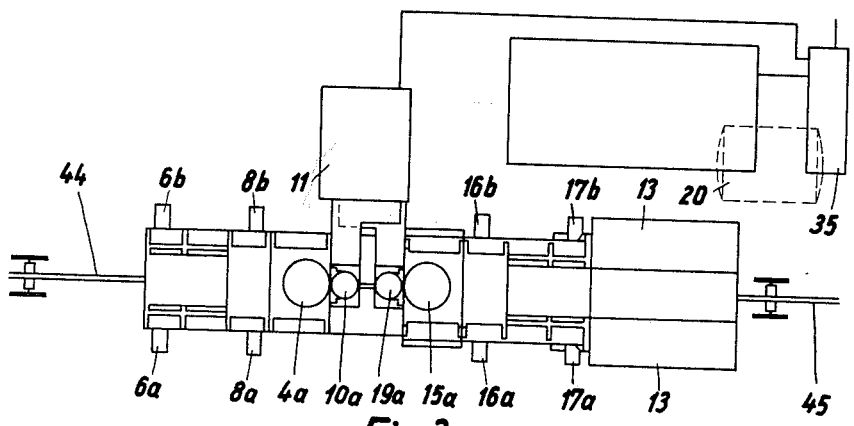
FIG. 2 is a diagrammatic top plan view of part of the structure of FIG. 1.

Referring to FIG. 1, it will be seen that the illustrated machine has a frame composed of a lower frame assembly 1 and an upper frame assembly 2, the upper frame assembly 2 being fixedly carried by and electrically insulated from the lower assembly 1. The upper frame assembly 2 carries a pair of powerful gripping members 3a and 3b, shown in FIG. 3, these gripping members being capable of exerting a force of from 60 to 400 tons, for example, and the gripping members 3a and 3b are movable along a vertical axis and of course are coaxial. The gripping members are connected to pistons which are movable in cylinders 4a and 4b, and hydraulic fluid is supplied to the cylinders for moving the gripping members 3a and 3b. In FIG. 1 only the upper gripping member 3a and its cylinder 4a are shown. In addition, the upper frame assembly 2 carries a pair of gripping members 5a and 5b which are movable with respect to each other along a common horizontal axis as well as a second pair of gripping members 7a and 7b which are also movable with respect to each other along a common horizontal axis, the force which is capable of being exerted by the pairs of gripping members 5a, 5b and 7a, 7b being much less than that which can be exerted by the powerful gripping members 3a and 3b. The gripping members 5a and 5b have piston portions respectively located in cylinders 6a and 6b to which hydraulic fluid is supplied, and gripping members 7a and 7b have piston portions slidable in cylinders 8a and 8b, respectively, to which hydraulic fluid also is supplied. In FIG. 1 only the cylinders 6a and 8a are visible, while FIG. 2 shows in addition the cylinders 6b and 8b. A pair of electrodes 9a and 9b, having copper work-engaging portions, for example, are also carried by the frame assembly 2 for vertical movement one with respect to the other along a common vertical axis, and as is apparent from FIG. 3 the electrode 9a is connected to a pair of piston portions which are fixed to each other in tandem and which are respectively slidable in a pair of cylinders 10a and 10a' which are adapted to be provided with hydraulic fluid under pressure for a purpose described below, the lower electrode 9b being fixed to a piston portion which slides in a cylinder 10b to which hydraulic fluid is also supplied in a manner described below. The welding location X is indicated in FIG. 1, and it is apparent that the electrodes 9a and 9b are located between the welding location X and the powerful work-gripping members 3a and 3b. Only the upper cylinder assembly 10a, 10a' is shown in FIG. 1, while FIG. 2 shows only the upper cylinder 10a. The electrodes 9a and 9b are electrically connected to one of the secondary poles of a welding transformer 11 shown diagrammatically in FIG. 2, and this electrical connection is conventional.

A carriage 12 is symmetrically constructed with respect to the upper frame assembly 2 and with respect to a vertical plane which passes through the welding location X and is perpendicular to the plane of FIG. 1, and this carriage 12 is movable to the left and right, as viewed in FIG. 1 on the lower frame assembly 1. In order to drive the carriage 12 there are a pair of cylinders 13 providing a hydraulic drive structure and housing pistons, for example, which are operatively connected to the carriage 12 so that when the pistons reciprocate in the cylinders 13 the carriage 12 also moves horizontally. The carriage 12 carries pairs of gripping members and a pair of electrodes as well as hydraulic drives therefor all of which correspond to and are symmetrically arranged with respect to the gripping members, electrodes, and drives therefor which are carried by the assembly 2. Thus, a pair of powerful gripping members corresponding to the gripping members 3a and 3b and movable along a common vertical axis are carried by the carriage 12, and of this pair of powerful gripping members only the gripping member 14a and the cylinder 15a in which a piston connected to the gripping member 14a slides are shown in FIGS. 1 and 2. The pair of cylinders 16a and 16b and the pair of cylinders 17a and 17b, also shown in FIGS. 1 and 2, slidably hold the pistons which are respectively fixed to horizontally acting gripping members corresponding to the pairs of gripping members 5a, 5b and 7a, 7b. A pair of electrodes 18a and 18b are carried by the carriage 12 for movement along a common vertical axis with respect to each other, and these electrodes respectively correspond to the electrodes 9a and 9b and are actuated in the same way, only the upper cylinder 19a being indicated in FIGS. 1 and 2, but it is to be understood that the electrodes 18a and 18b are moved in exactly the same way as the electrodes 9a and 9b. The pair of electrodes 18a and 18b are electrically connected to the other of the secondary poles of the welding transformer 11.

All of the above-mentioned cylinders in which the pistons connected to the various gripping members and electrodes are located are double-acting in the sense that the pistons therein can be driven in both directions, with the exception of the cylinder 10a' and of course with the exception of the corresponding cylinder which is connected operatively to the electrode 18a. When the hydraulic fluid under pressure is delivered to those portions of the cylinders which communicate with the faces of the pistons therein which are directed away from the gripping members and the electrodes, these gripping members and electrodes will be moved toward each other while when the hydraulic fluid under pressure is directed to those faces of the pistons which are directed toward the gripping members and the electrodes these gripping members and electrodes will be moved away from each other.

Figure 3:
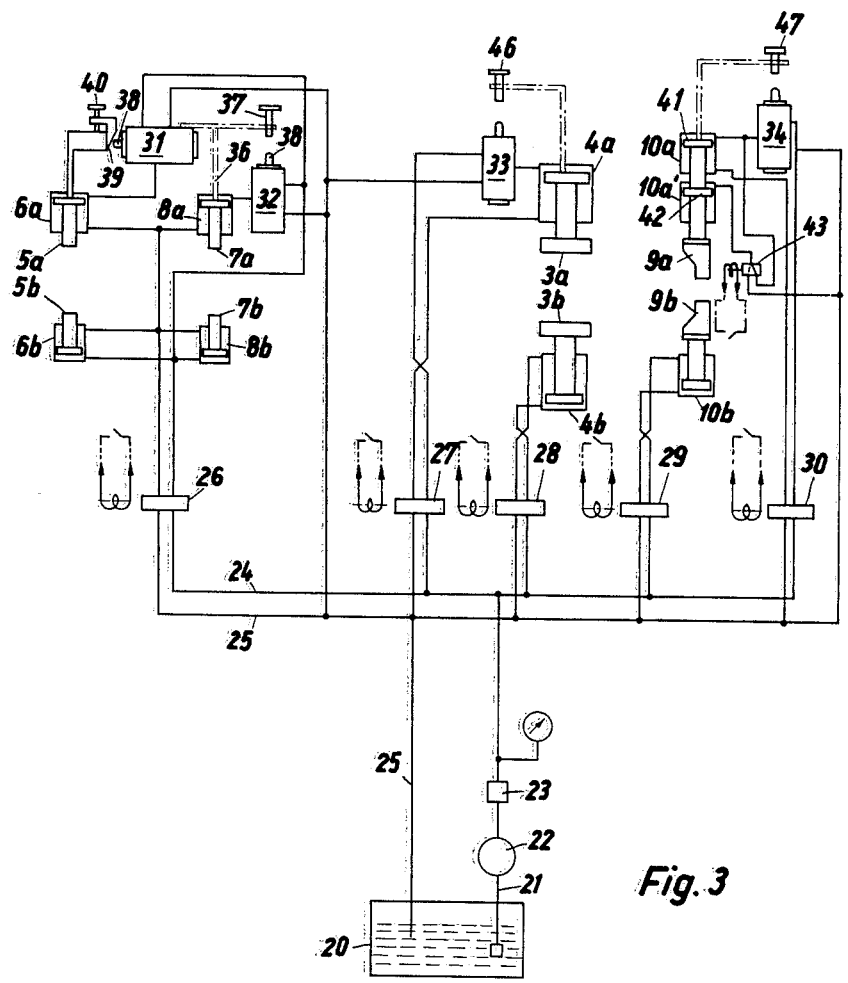
FIG. 3 is a schematic illustration of the hydraulic arrangement of the structure of the invention, FIG. 3 also showing diagrammatically part of the electrical structure.

The hydraulic installation for driving the several gripping members and electrodes is diagrammatically illustrated in FIG. 3. However, the hydraulic installation for driving the carriage 12 as well as for driving the gripping members and electrodes carried by the carriage 12 are not illustrated, these drives being the same as that shown in FIG. 3 for the structure carried by the frame portion 2.

Referring to FIG. 3, it will be seen that the hydraulic fluid, which may be oil, is derived from a reservoir 20 into which a suction conduit 21 extends, this suction conduit leading to the intake of a pump 22 which pumps the fluid under pressure along a pressure discharge conduit 24, the fluid first passing through a non-return valve 23. A return-flow conduit 25 of low pressure returns the hydraulic fluid to the reservoir 20. The conduits 24 and 25 are connected to the several cylinders in the manner shown in FIG. 3, and the flow of fluid through the conduits is controlled by the several solenoid-operated valves 26–30. Thus, the valve 26 controls the manner in which the fluid flows through the conduits 24 and 25 to and from the cylinders 6a, 6b, 8a, and 8b, while the valve 27 controls the flow of fluid with respect to the cylinder 4a, the valve 28 controls the flow of fluid in the cylinder 4b, the valve 29 controls the flow of fluid in the cylinder 10b, and the valve 30 controls the flow of fluid in the cylinder 10a. Each of the valves 26–30 has the same construction, and the structure of each of these valves is indicated diagrammatically in FIGS. 4 and 5. When the solenoids are energized the valves will have the position indicated in FIG. 4, while when the solenoids are not energized the valves will have the position shown in FIG. 5, the movable valve members being moved to the position of FIG. 5 by a spring, as diagrammatically indicated in FIG. 5, while the energizing of the solenoid draws the armature thereof in opposition to the spring to the position indicated in FIG. 4 to give the valve the position shown in FIG. 4. As is apparent from FIG. 3, there are left and right conduits extending upwardly from each of the valves 26–30. When the parts have the position shown in FIG. 4, the fluid under pressure in the conduit 24 will be delivered to the left conduit, while the right conduit will be connected to the return flow conduit 25. Thus, when the solenoids are energized so as to give the valves the position shown in FIG. 4, the pressure fluid will flow along the left hand conduits extending upwardly from each of the valves 26–30 into the several cylinders at the sides of the pistons therein which are directed toward the gripping members and the electrodes, so that in the position of the parts shown in FIG. 4 the several gripping members and electrodes will all be retracted, which is to say moved away from each other. On the other hand, when the solenoids are not energized the valves will have the position shown in FIG. 5, and it will be noted that in this position the left hand conduit extending upwardly from each of the valves, as viewed in FIG. 3, communicates with the return flow conduit 25, while the right hand conduit extending upwardly from each of the valves 26–30 of FIG. 3 now receives the fluid under pressure. These right hand conduits will therefore deliver the fluid under pressure to those faces of the pistons which are directed away from the several gripping members and electrodes, so that with the valves in the position indicated in FIG. 5 the several gripping members and electrodes will be moved toward each other. Thus, each pair of gripping members and each pair of electrodes is acted upon by a moving means capable of moving at least one of each pair of gripping members and electrodes toward the other of the pair of gripping members and electrodes, and in the illustrated example both of the gripping members of each pair and both of the electrodes of each pair are moved toward and away from each other with the arrangement shown in FIG. 3. As is diagrammatically indicated in FIG. 3, separate switches are available for energizing the several valves at the option of the operator in accordance with any desired selection, and all of these switches are arranged on a switchboard 35 so that from the switchboard 35 the operator can energize selected solenoids to cause the valves connected thereto to be placed in positions where the gripping members or electrodes remain retracted. When it is desired not to operate any of the gripping members or electrodes, the valve which controls the same is energized so as to be placed in a position shown in FIG. 4, while in order to provide movement of selected pairs of gripping members and electrodes the operator merely opens the switches associated therewith so that the valve will assume the position shown in FIG. 5 and the hydraulic structure will then operate to cause the gripping members or electrodes to move toward each other.

The pistons in the cylinders 4a, 6a, and 8a have greater areas than the pistons in the corresponding cylinders 4b, 6b, and 8b, respectively. An additional valve assembly controls the flow of hydraulic fluid to the larger cylinders 4a, 6a, and 8a as well as to the cylinder 10a when the fluid is delivered thereto for moving the pistons therein along their working strokes causing the gripping members and electrodes connected thereto to approach their cooperating gripping members and electrodes. Thus, between the valve 26 and the cylinders 6a and 8a are located a pair of valve assemblies 31 and 32, respectively, while the valve assembly 33 is located between the valve 27 and the cylinder 4a, and the valve assembly 34 is located between the valve 30 and the cylinder 10a. Elements which are connected to the several pistons in the cylinders 4a, 6a, 8a, and 10a actuate the several valve assemblies 33, 31, 32, and 34, respectively, for placing the fluid in communication with the discharge conduit 25 so as to provide a balance between the forces acting on the cooperating pairs of gripping members and electrodes. A valve structure which operates on substantially the same principle as each of the valves 31–34 is disclosed in U.S. Patent 2,875,-718, and the details of each of the valve assemblies 31–34 are shown diagrammatically in FIGS. 6 and 7. As may be seen from FIGS. 6 and 7, each of the valves 31–34 includes an outer housing in which an elongated valve member is slidable, this valve member being urged by a spring to the rest position indicated in FIG. 6. However, the projecting free end portion 38 of the valve member is capable of being engaged, in a manner described below, so as to urge the valve member in opposition to the spring from the position of FIG. 6 to that of FIG. 7. The longitudinally slidable valve member is bored in the manner indicated in FIGS. 6 and 7. When the valve is in the position of FIG. 6 the pressure fluid from the conduit 24 will flow through the valve member before reaching the cylinder so as to act on the piston thereof when driving the gripping member or electrode toward the work. In a manner described below the valve member will be shifted to the position indicated in FIG. 7 where the fluid under pressure which is being delivered to the cylinder will be placed in communication with the discharge conduit 25 through the bore of relatively small diameter in the movable valve member, so that in this way the pressure will drop at a preselected moment and balance between the pairs of cooperating pistons will be automatically achieved. Of course, when the pistons are retracted the upper left hand conduits shown in FIGS. 6 and 7 as being supplied with fluid under pressure from the pressure conduit 24 are placed in communication with the low pressure conduit 25, so that at this time with each of the valve assemblies 31–34 in the position shown in FIG. 6 the fluid can flow back out of the cylinder to the tank 20 along the conduit 25.

The piston which is fixed to the gripping member 7a is also fixed to an elongated rod 36 which extends fluid-tightly through that end wall of the cylinder 8a which is directed away from the gripping member 7a, and the rod 36 therefore moves with this piston. The rod 36 is fixed to the housing of the valve 31 so that the entire valve 31 moves with the gripping member 7a. Of course, the conduits are flexible so as to allow the necessary movement of the various parts to take place. The rod 36 is also connected to an element which has a threaded bore coaxial with the movable valve member of the valve assembly 32, and this threaded bore carries a manually turnable screw 37 which is capable of being adjusted so that the screw 37 will engage the parts 38 of the valve assembly 32 when the gripping member 7a has been advanced to a predetermined extent. Thus, in accordance with the setting of the screw 37 the slidable valve member of the valve assembly 32 will be shifted from the position of FIG. 6 to that of FIG. 7 after the gripping member 7a has been advanced to a predetermined extent, and at this time balance between the gripping members 7a and 7b will be achieved because although the area of the piston connected to the gripping member 7a is greater, nevertheless when the screw member 37 engages the part 38 of valve assembly 32 to shift the valve member therein to the position of FIG. 7 the pressure is reduced because part of the fluid will flow back to the discharge conduit 25 as is apparent from FIG. 7. Before the screw member 37 engages the member 38 of valve assembly 32 the gripping member 7a will have a greater force applied thereto than the gripping member 7b, so that even though both of these members engage the work the gripping member 7a will continue to advance and will act through the workpiece on the gripping member 7b to move the latter back into the cylinder 8b until element 37 actuates the valve assembly 32. In this way it is possible by adjusting the screw 37 to determine the actual position of the workpiece when it is gripped by the gripping members 7a and 7b. The element 38 of the valve assembly 31 cooperates with an inclined surface 39 of an element which is carried by an extension of the piston connected to the gripping member 5a, and the position of the element which has the surface 39 is regulated by the threaded member 40 which is turnably carried by the extension of the piston connected to the gripping member 5a, the screw member 40 being capable of turning but not moving axially with respect to the structure which carries the screw member 40, so that when the screw member turns the element which has the surface 39 is shifted in a direction parallel to the axis of the gripping member 5a, and thus the moment when the element 38 of valve assembly 31 will be actuated to stop the movement of the piston connected to the gripping member 5a can also be adjusted. With this arrangement it is therefore possible not only to grip the workpiece but also to orient the same in a horizontal plane, the structure being able to shift the entire workpiece laterally as well as to angularly position the same.

The cylinders 10a and 10a' respectively have pistons 41 and 42 slidable therein and fixed to each other for movement together, and while the piston 41 is double-acting, the piston 42 is single-acting. The face of the piston 42 which is directed toward the electrode 9a is always at a relatively low pressure as by connecting the end wall of the cylinder 10a' which is nearest to the electrode 9a to the outer atmosphere. The face of the piston 42 which is directed away from the electrode 9a is capable of being placed either in communication with the pressure fluid in the conduit 24 or in communication with the low pressure conduit 25. When the electrode 9a is advanced toward the electrode 9b the pressure fluid arrives to the cylinder 10a through the valve assembly 34. The flow of fluid to and from the cylinder 10a is controlled by the valve 30. At the switchboard 35 is located an additional switch which controls the solenoid valve 43 which in one position places the interior of the cylinder 10a' at the part thereof above the piston 42 in communication with the conduit 24 and in the other position places this space of the cylinder 10a' in communication with the discharge conduit 25. It will be noted that when fluid under pressure is delivered from the conduit 24 to the cylinder 10a', this fluid first passes through the valve assembly 34. As was pointed out above, the pistons which are connected to the gripping members 5a, 5b, 7a, 7b are substantially smaller than the pistons connected to the powerful gripping members 3a, 3b, and also the pistons in the cylinders 10a, 10a' and 10b are substantially smaller than the pistons connected to the gripping members 3a and 3b.

Rails 44 and 45 are diagrammatically shown in FIG. 1 as the workpieces which are to be gripped and engaged by the gripping members and electrodes, and these rails 44 and 45 are the workpieces which are welded together.

When the workpieces are large and heavy, the valve 43 is placed in the position where the interior of the cylinder 10a' above the piston 42 therein communicates with the discharge conduit 25, so that pressure fluid is not at this time applied to the piston 42 for driving the electrode 9a. The screw 47 which is coaxial with the movable valve member of the valve assembly 34 and which is carried by a rod connected to the piston 41 is at this time retracted to such an extent that this screw 47 will not actuate the valve 34 and thus since the diameters of the pistons in the cylinders 10a and 10b are equal the electrodes 9a and 9b will be acted upon by equal forces to engage the work with equal forces. With the rails located between the several pairs of gripping members and electrodes, the valves are actuated so as to assume the position shown in FIG. 5, and thus the several gripping members and electrodes will be moved toward the work by the hydraulic moving means described above. Thus, at this time oil under pressure will flow into the several cylinders at the sides of the pistons therein which are directed away from the gripping members and electrodes while oil will discharge from the cylinders at the parts thereof located on the other sides of the pistons, and this discharge fluid will return to the tank 26 through the conduit 25.

Inasmuch as the piston in the cylinder 4a has a greater diameter than that in the cylinder 4b, a greater force acts on the gripping member 3a as long as the movable valve member of the valve assembly 33 is not moved from the position indicated in FIG. 6. As soon as the gripping members 3a and 3b engage the work, the gripping member 3a will continue to advance and the gripping member 3b will move back toward the cylinder 4b, in exactly the manner described above in connection with the gripping members 7a and 7b. However, when the screw member 46 which is connected to the piston of the gripping member 3a for movement therewith engages the movable valve member of the valve assembly 33 to move this movable member, so as to locate the valve member into position shown in FIG. 7, the pressure applied to the gripping member 3a will drop since part of the oil will now return to the conduit 25. The extent of flow of the fluid back to the conduit 25 will vary with the extent to which the movable valve member of the valve assembly 33 is moved, and in this way the force acting on the piston 3a drops until it equals the force which acts on the gripping member 3b. The balance is achieved when the force acting on the piston 3b equals the force acting on the piston 3a plus the weight of the workpiece on the gripping member 3b, and the valve assembly 33 will operate automatically to stop the movement of the piston connected to the gripping member 3a when this balance is achieved. At this time both of the pistons respectively connected to the gripping members 3a and 3b will remain stationary. By adjusting the screw 46 it is possible to control the position of the gripping member 3a in which the rail 44 is gripped thereby, and this adjustment may be made even while the workpiece is gripped by the members 3a and 3b.

The valve assemblies 31 and 32 are operated in the above-described manner to control the moment when the gripping members 5a and 7a stop advancing toward the gripping members 5b and 7b, respectively, although in this case the weight of the workpiece has no effect. The gripping members 5a and 7a are always advanced to the same extent. The balance between the gripping members 5a and 5b, on the one hand, and the gripping members 7a and 7b on the other hand, is controlled by the setting of the screws 40 and 37. Lateral shifting of the workpiece is possible, however, only when the workpiece is not gripped by the gripping members 3a and 3b or engaged by the electrodes 9a and 9b.

Inasmuch as the cylinder 10a' communicates at this time with the low pressure conduit 25 and the screw 47 has been turned so far away from the valve assembly 34 that it will not actuate the movable valve member thereof, equal and opposite forces act on the electrodes 9a and 9b so that they do not have any influence on the position of the workpiece and simply follow any change in the position thereof.

The operation of the several gripping members and electrodes carried by the carriage 12 is exactly the same as that described above for the gripping members and electrodes carried by the frame assembly 2. The welding transformer 11 is of such a size that it is capable of handling the largest workpiece. Of course, the gripping members and electrodes of the carriage 12 will cooperate with the workpiece 45, while the gripping members and electrodes of the frame 2 will cooperate with the rail 44.

With the workpieces gripped and aligned with each other and electrically connected to the transformer 11, the welding process takes place by actuation of the pistons in the cylinders 13, and this flash welding process is well-known. The force with which the fluid in the cylinders 13 can move the workpiece 44 toward the workpiece 45 is great enough to accommodate workpieces of the largest cross-section.

As was indicated above, all of the above described structure if used to work with relatively small, light workpieces would damage the workpiece because the powerful gripping members 3a and 3b, as well as the corresponding gripping members of the carriage 12 are incapable of exerting a force small enough to grip relatively small, light workpieces without damaging them. In accordance with the present invention, when the apparatus is to hold relatively light, small workpieces, the operator will not open those switches which are electrically connected with the solenoid valve 27 and 28 so that these valves will remain in the position shown in FIG. 4 and thus the gripping members 3a and 3b will not be driven and will not engage the workpiece, and the same is of course true for the corresponding powerful gripping members of the carriage 12. Thus, when working with relatively light, small workpieces the powerful gripping members remain retracted and are not used. However, at this time the operator will actuate the solenoid valve 43 so that the fluid under pressure which flows to the cylinder 10a above the piston 41 therein will also flow to the cylinder 10a' above the piston 42 in the latter, and thus in this case the force which actuates the electrode 9a is increased and is greater than the force which actuates the electrode 9b. The welding transformer also is adjusted so as to have an output which is proper for the relatively small cross-section of a smaller workpiece. The electrode 9a will of course be driven with a greater force than the electrode 9b, and the screw 47 can now be adjusted to actuate the valve member of the valve assembly 34 so as to stop the movement of the electrode 9a when the workpiece is located in the desired position. The electrodes 9a and 9b in this case act not only to connect the workpiece electrically with the welding transformer but also to grip and hold the small relatively light workpiece and to determine the elevation thereof. The parts are shown in FIG. 1 in the position they take when working with relatively light workpieces, and it will be noted that in this position while the electrodes 9a and 9b engage the rail 44 the gripping member 3a is spaced therefrom. Of course, the other gripping member 3b is also spaced therefrom, and at the carriage 12 the electrodes 18a and 18b engage the rail 45 while the gripping member 14a and the other powerful gripping member are spaced from the rail 45. The pistons in the cylinders 13 at this time are driven with a smaller force in keeping with the smaller size of the work.

It is thus possible with the machine of the invention to operate on the one hand in such a way that the powerful gripping members 3a, 3b and the corresponding gripping members of the carriage 12 grip and hold the work, in which case the pairs of electrodes serve only to provide electrical connections with the work, or it is possible to maintain the powerful gripping members retracted and to use the electrodes not only to grip and hold the work but also to conduct electricity thereto. There is a third possibility in the case where a relatively light workpiece is welded to a relatively heavy workpiece. In this case one of the pairs of powerful gripping members will be operated while the electrodes associated therewith will only be used for conducting electricity, while the other of the pairs of powerful gripping members will not be operated and the pair of electrodes associated therewith will be used to grip the light workpiece as well as to conduct electricity thereto.

It should be noted that the gripping members 5a, 5b and 7a, 7b are used both with light as well as with heavy workpieces, but these gripping members are relatively small and do not exert a force great enough to injure small, light workpieces. The relatively small gripping members 5a, 5b and 7a, 7b exert a force on the order of that exerted by the electrodes 9a and 9b, and while the gripping members 5a, 5b and 7a, 7b serve to orient the workpiece, as described above, in the case of relatively light, small workpieces, they also contribute to the holding of the workpiece.

It will be understood that each of the elements described above, or two or more together, may also find a useful application in other types of work-holding apparatus differing from the types described above.

While the invention has been illustrated and described as embodied in work-gripping apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a work-holding apparatus for welding machines or the like, in combination, a pair of electrodes and a pair of work-gripping members; first moving means operatively connected to at least one of said electrodes for moving the same toward the other of said electrodes to place a workpiece located between said electrodes in engagement with said electrodes so that current can be conducted through said electrodes to the workpiece; second moving means operatively connected to at least one of said work-gripping members for moving the same toward the other of said work-gripping members so that a workpiece located between said work-gripping members can be engaged and gripped by said work-gripping members to be supported thereby, the gripping force produced by said work-gripping members being greater than the engaging force produced by said electrodes; and means cooperating with said second moving means for rendering the same operative or inoperative, at the option of the operator, with said first moving means so that when the workpiece is relatively heavy said second moving means can be rendered operative to cause a relatively heavy workpiece to be gripped and supported by the pair of work-gripping members while engaged by the pair of electrodes, while when a workpiece is relatively light the second moving means can be rendered inoperative so that such a relatively light workpiece will be gripped and held by said electrodes to have not only current supplied thereto by said electrodes but also to be supported by said electrodes.

2. In a work-holding apparatus for welding machines or the like, in combination, a pair of electrodes and a pair of work-gripping members; adjustable first moving means operatively connected to at least one of said electrodes for moving the same toward the other of said electrodes to engage with said electrodes an elongated workpiece located therebetween so that current can be conducted to said workpiece through said electrodes; second moving means operatively connected to at least one of said work-gripping members for moving the same toward the other of said work-gripping members for gripping therebetween the elongated workpiece so that the latter will be held and supported by said pair of work-gripping members, the gripping force produced by said work-gripping members being greater than the engaging force produced by said electrodes; means cooperating with said second moving means for rendering the latter inoperative at the option of the operator so that when the workpiece is relatively heavy the second moving means can be actuated to grip the heavy workpiece with the work-gripping members while when the workpiece is relatively light the second moving means can be maintained inoperative while a relatively light workpiece is engaged only by said electrodes to be held and supported thereby as well as to have current conducted thereto by said electrodes; and adjusting means cooperating with said first moving means for adjusting the latter to apply to said one electrode a greater force when said second moving means is rendered inoperative.

3. In a work-holding apparatus for welding machines and the like, in combination, a pair of coaxial electrodes spaced from each other and arranged along a vertical axis so that an elongated horizontal workpiece can extend between said electrodes; a pair of coaxial work-gripping members also arranged along a vertical axis so that the workpiece can extend therebetween; two pairs of work-gripping members each arranged along a horizontal axis for laterally engaging a horizontal workpiece located therebetween; a plurality of moving means respectively cooperating with at least one of each pair of gripping members and at least one of said electrodes for moving the same toward the other of each pair of gripping members and the other electrode so that the workpiece can be held and supported by said first-mentioned pair of work-gripping members and can be horizontally oriented by said pairs of horizontal work-gripping members while the workpiece can be engaged by said electrodes to have electrical current supplied thereto, at least the gripping force produced by said first mentioned work-gripping members being greater than the engaging force produced by said electrodes; and means cooperating with that moving means which cooperates with said one work-gripping member of the pair of gripping members which are movable along a vertical axis for rendering the latter moving means inoperative at the option of the operator, so that a relatively light workpiece can be held without the use of the pair of work-gripping members which are movable along a vertical axis while the moving means cooperating with the latter work-gripping members can be rendered operative when the workpiece is relatively heavy.

4. In a work-holding apparatus for welding machines and the like, in combination, a pair of coaxial electrodes spaced from each other and arranged along a vertical axis so that an elongated horizontal workpiece can extend between said electrodes; a pair of coaxial work-gripping members also arranged along a vertical axis so that the workpiece can extend therebetween; two pairs of work-gripping members each arranged along a horizontal axis for laterally engaging a horizontal workpiece located therebetween; a plurality of moving means respectively cooperating with at least one of each pair of gripping members and at least one of said electrodes for moving the same toward the other of each pair of gripping members and the other electrode so that the workpiece can be held and supported by said first-mentioned pair of work-gripping members and can be horizontally oriented by said pairs of horizontal work-gripping members while the workpiece can be engaged by said electrodes to have electrical current supplied thereto, at least the gripping force produced by said first mentioned work-gripping members being greater than the engaging force produced by said electrodes; means cooperating with that moving means which cooperates with said one work-gripping member of the pair of gripping members which are movable along a vertical axis for rendering the latter moving means inoperative at the option of the operator, so that a relatively light workpiece can be held without the use of the pair of work-gripping members which are movable along a vertical axis while the moving means cooperating with the latter work-gripping members can be rendered operative when the workpiece is relatively heavy; and means cooperating with the moving means which actuates said one electrode for applying to said one electrode a greater force when the moving means which cooperates with the vertically movable work-gripping member is rendered inoperative.

5. In a work-holding apparatus for machine tools or the like, in combination, a pair of electrodes movable toward and away from each other and a pair of work-gripping members movable toward and away from each other; first moving means cooperating with said electrodes for moving the same toward and away from each other; second moving means cooperating with said work-gripping members for moving the same toward and away from each other, the gripping force produced by said work-gripping members being greater than the engaging force produced by said electrodes; and means cooperating with said second moving means for rendering the latter inoperative at the option of the operator, so that a relatively light workpiece can be supported and gripped by said electrodes without the use of said work-gripping members while the latter can be used also to hold and support a relatively heavy workpiece when said second moving means is rendered operative.

6. In a work-holding apparatus for welding machines and the like, in combination, a pair of electrodes movable toward and away from each other and a pair of work-gripping members movable toward and away from each other; hydraulic moving means cooperating with said electrodes and with said work-gripping members for moving said electrodes toward and away from each other and for moving said work-gripping members toward and away from each other, the gripping force produced by said work-gripping members being greater than the engaging force produced by said electrodes; electrically operable valve means controlling the flow of fluid to said work-gripping members and operable at the option of the operator for rendering said work-gripping members inoperative so that a relatively light workpiece will be held only by said electrodes while current is also supplied thereto by said electrodes, said valve means being actuated by the operator to move said work-gripping members toward each other to grip and support the workpiece when the workpiece is relatively heavy.

7. In a work-holding apparatus for welding machines and the like, in combination, a pair of electrodes movable toward and away from each other and a pair of work-gripping members movable toward and away from each other; hydraulic moving means cooperating with said electrodes and with said work-gripping members for moving said electrodes toward and away from each other and for moving said work-gripping members toward and away from each other, the gripping force produced by said work-gripping members being greater than the engaging force produced by said electrodes; electrically operable valve means controlling the flow of fluid to said work-gripping members and operable at the option of the operator for rendering said work-gripping members inoperative so that a relatively light workpiece will be held only by said electrodes while current is also supplied thereto by said electrodes, said valve means being actuated by the operator to move said work-gripping members toward each other to grip and support the workpiece when the workpiece is relatively heavy, said hydraulic moving means including a pair of pistons and cylinders operatively connected to one of said electrodes and means for actuating only one of said pistons and cylinders when said valve means is actuated to render said work-gripping members operative and both of said pistons and cylinders when said work-gripping members are not operated, so that said electrodes can apply a greater force to a relatively light workpiece which is not supported by said work-gripping members.

8. In a work-holding apparatus for welding machines or the like, in combination, a pair of electrodes and a pair of work-gripping members; first moving means operatively connected to at least one of said electrodes for moving the same toward the other of said electrodes to place a workpiece located between said electrodes in engagement with the same so that current can be conducted through said electrodes to the workpiece; second moving means operatively connected to at least one of said work-gripping members for moving the same toward the other of said work-gripping members so that a workpiece located between said work-gripping members can be engaged and gripped by said work-gripping members to be supported thereby, the gripping force of said work-gripping members being greater than the engaging force of said electrodes; first adjusting means cooperating with said first moving means for adjusting the position of a workpiece when engaged by said electrodes; second adjusting means cooperating with said second moving means for adjusting the position of a workpiece when gripped by said work-gripping members; and means for rendering said first adjusting means inoperative and said first and second moving means and said second adjusting means operative or said first moving means and said first adjusting means operative and said second moving means and said second adjusting means inoperative, at the option of the operator, so that when the workpiece is relatively heavy said second moving means can be rendered operative to cause the relatively heavy workpiece to be gripped by said pair of work-gripping members and adjusted in position by said second adjusting means while being engaged by said pair of electrodes, while when the workpiece is relatively light said second moving means and said second adjusting means can be rendered inoperative so that the relatively light workpiece will be gripped by said electrodes so that the workpiece will be supported by said electrodes adjustable in position by said first adjusting means while current is supplied to the workpiece by said electrodes.

9. In a work-holding apparatus for welding machines or the like, in combination, a pair of electrodes and a pair of work-gripping members; a pair of first moving means respectively operatively connected to said pair of electrodes for moving the same toward each other to place a workpiece located between said electrodes in engagement with the same so that current can be conducted through said electrodes to the workpiece; a pair of second moving means respectively operatively connected to said pair of work-gripping members for moving the same toward each other so that a workpiece located between said work-gripping members can be engaged and gripped by said work-gripping members to be supported thereby, the gripping force of said work-gripping members being greater than the engaging force of said electrodes; first adjusting means cooperating with said pair of first moving means for producing a greater pressure by one of said electrodes connected to one of said first moving means on a workpiece engaged by said electrodes until a predetermined position of the workpiece is reached and for equalizing the pressures by said electrodes on said workpiece when said position is reached for adjusting the position of a workpiece when engaged by said electrodes; second adjusting means cooperating with said pair of second moving means for producing a greater pressure by one of said gripping members connected to one of said second moving means on a workpiece engaged by said gripping members until a predetermined position of the workpiece is reached and for equalizing the pressures by said gripping members on said workpiece when said position is reached for adjusting the position of a workpiece when gripped by said work-gripping members; and means for rendering said first adjusting means inoperative and said first and second moving means and said second adjusting means operative or said first moving means and said first adjusting means operative and said second moving means and said second adjusting means inoperative, at the option of the operator, so that when the workpiece is relatively heavy said second moving means can be rendered operative to cause the relatively heavy workpiece to be gripped by said pair of work-gripping members and adjusted in position by said second adjusting means while being engaged by said pair of electrodes, while when the workpiece is relatively light said second moving means and said second adjusting means can be rendered inoperative so that the relatively light workpiece will be gripped by said electrodes so that the workpiece will be supported by said electrodes adjustable in position by said first adjusting means while current is supplied to the workpiece by said electrodes.

10. A work-holding apparatus as set forth in claim 9 in which said moving means are hydraulic moving means each including a cylinder and a piston slidably guided in said cylinder, and conduit means for feeding pressure fluid into and out from the respective cylinder; and wherein said adjusting means each includes a throttling valve in the respective conduit means and being movable between an open and a throttling position, and adjustable means connected to the respective piston for moving said throttling valve from said open to said throttling position at a predetermined stroke of the respective piston.

References Cited by the Examiner
UNITED STATES PATENTS
2,787,698  4/57  Schlatter et al. _____ 219—101

RICHARD M. WOOD, Primary Examiner.